(12) United States Patent
Elshafie et al.

(10) Patent No.: US 11,831,376 B2
(45) Date of Patent: Nov. 28, 2023

(54) JOINT CHANNEL STATE INFORMATION AND DECODING FEEDBACK

(71) Applicant: QUALCOMM Incorporated, San Diego, CA (US)

(72) Inventors: Ahmed Elshafie, San Diego, CA (US); Wei Yang, San Diego, CA (US); Yi Huang, San Diego, CA (US); Hwan Joon Kwon, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 86 days.

(21) Appl. No.: 17/222,705

(22) Filed: Apr. 5, 2021

(65) Prior Publication Data

US 2022/0321186 A1 Oct. 6, 2022

(51) Int. Cl.
*H04B 7/06* (2006.01)
*H04L 1/1867* (2023.01)
*H04W 72/02* (2009.01)
*H04W 72/21* (2023.01)
*H04W 72/53* (2023.01)
*H04L 27/26* (2006.01)
*H04W 24/00* (2009.01)

(52) U.S. Cl.
CPC ......... *H04B 7/0626* (2013.01); *H04L 1/1896* (2013.01); *H04W 72/02* (2013.01); *H04W 72/21* (2023.01); *H04W 72/53* (2023.01); *H04L 27/2646* (2013.01); *H04W 24/00* (2013.01)

(58) Field of Classification Search
CPC .. H04B 7/0619; H04B 7/0621; H04B 7/0626; H04B 10/07; H04B 10/0773; H04B 10/0775; H04B 17/00; H04L 1/18; H04L 1/1867; H04L 1/1896; H04L 1/0687; H04L 1/93; H04L 27/2646; H04L 47/26; H04L 43/00; H04L 43/04; H04L 43/08; H04W 72/00; H04W 72/02; H04W 72/04; H04W 72/0493; H04W 24/00; H04W 24/08

See application file for complete search history.

(56) References Cited

U.S. PATENT DOCUMENTS

| | | | |
|---|---|---|---|
| 11,641,255 B2* | 5/2023 | Dinan | H04L 5/0094 370/329 |
| 2012/0088514 A1* | 4/2012 | Lee | H04B 7/063 455/450 |
| 2018/0198561 A1* | 7/2018 | Tsai | H04L 1/007 |
| 2018/0331743 A1* | 11/2018 | Shen | H04B 7/0626 |
| 2019/0297630 A1* | 9/2019 | Chen | H04L 1/1893 |
| 2021/0367647 A1* | 11/2021 | Wu | H04B 7/0478 |
| 2022/0053512 A1 | 2/2022 | Rassam et al. | |
| 2022/0077967 A1* | 3/2022 | Zhou | H04L 5/0055 |

(Continued)

FOREIGN PATENT DOCUMENTS

| CN | 108292966 | * | 6/2016 | ......... H04L 27/3488 |
|---|---|---|---|---|
| CN | 2021147764 | * | 7/2021 | ............... H04L 5/00 |

*Primary Examiner* — Warner Wong
(74) *Attorney, Agent, or Firm* — Harrity & Harrity, LLP

(57) ABSTRACT

Various aspects of the present disclosure generally relate to wireless communication. In some aspects, a user equipment (UE) may determine, based at least in part on one or more decoding outcomes associated with one or more downlink communications, a resource, of a set of candidate resources, to use for transmitting a channel state information (CSI) report. The UE may transmit the CSI report via the resource. Numerous other aspects are described.

31 Claims, 11 Drawing Sheets

(56) References Cited

U.S. PATENT DOCUMENTS

| | | | |
|---|---|---|---|
| 2022/0225290 A1* | 7/2022 | Ganesan | H04W 24/10 |
| 2022/0256387 A1* | 8/2022 | Xiao | H04W 24/08 |
| 2022/0286176 A1* | 9/2022 | Grossmann | H04B 7/0626 |
| 2022/0304001 A1* | 9/2022 | Lee | H04W 72/0446 |
| 2022/0312346 A1* | 9/2022 | Muruganathan | H04B 7/0482 |
| 2022/0352950 A1* | 11/2022 | Faxér | H04B 7/0626 |
| 2023/0189220 A1* | 6/2023 | Liu | H04W 76/28 |
| | | | 370/329 |

* cited by examiner

JOINT CHANNEL STATE INFORMATION AND DECODING FEEDBACK

FIELD OF THE DISCLOSURE

Aspects of the present disclosure generally relate to wireless communication and to techniques and apparatuses for joint channel state information and decoding feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining, based at least in part on one or more decoding outcomes associated with one or more downlink communications, a resource, of a set of candidate resources, to use for transmitting a channel state information (CSI) report; and transmitting the CSI report via the resource.

In some aspects, a method of wireless communication performed by a base station includes receiving a CSI report via a resource of a set of candidate resources configured for receiving the CSI report; and determining, based at least in part on receiving the CSI report via the resource, one or more decoding outcomes associated with one or more downlink communications.

In some aspects, a UE for wireless communication includes a memory; and one or more processors, coupled to the memory, configured to: determine, based at least in part on one or more decoding outcomes associated with one or more downlink communications, a resource, of a set of candidate resources, to use for transmitting a CSI report; and transmit the CSI report via the resource.

In some aspects, a base station for wireless communication includes a memory; and one or more processors, coupled to the memory, configured to: receive a CSI report via a resource of a set of candidate resources configured for receiving the CSI report; and determine, based at least in part on receiving the CSI report via the resource, one or more decoding outcomes associated with one or more downlink communications.

In some aspects, a non-transitory computer-readable medium storing a set of instructions for wireless communication includes one or more instructions that, when executed by one or more processors of a UE, cause the UE to: determine, based at least in part on one or more decoding outcomes associated with one or more downlink communications, a resource, of a set of candidate resources, to use for transmitting a CSI report; and transmit the CSI report via the resource.

In some aspects, a non-transitory computer-readable medium storing a set of instructions for wireless communication includes one or more instructions that, when executed by one or more processors of a base station, cause the base station to: receive a CSI report via a resource of a set of candidate resources configured for receiving the CSI report; and determine, based at least in part on receiving the CSI report via the resource, one or more decoding outcomes associated with one or more downlink communications.

In some aspects, an apparatus for wireless communication includes means for determining, based at least in part on one or more decoding outcomes associated with one or more downlink communications, a resource, of a set of candidate resources, to use for transmitting a CSI report; and means for transmitting the CSI report via the resource.

In some aspects, an apparatus for wireless communication includes means for receiving a CSI report via a resource of a set of candidate resources configured for receiving the CSI report; and means for determining, based at least in part on receiving the CSI report via the resource, one or more decoding outcomes associated with one or more downlink communications.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
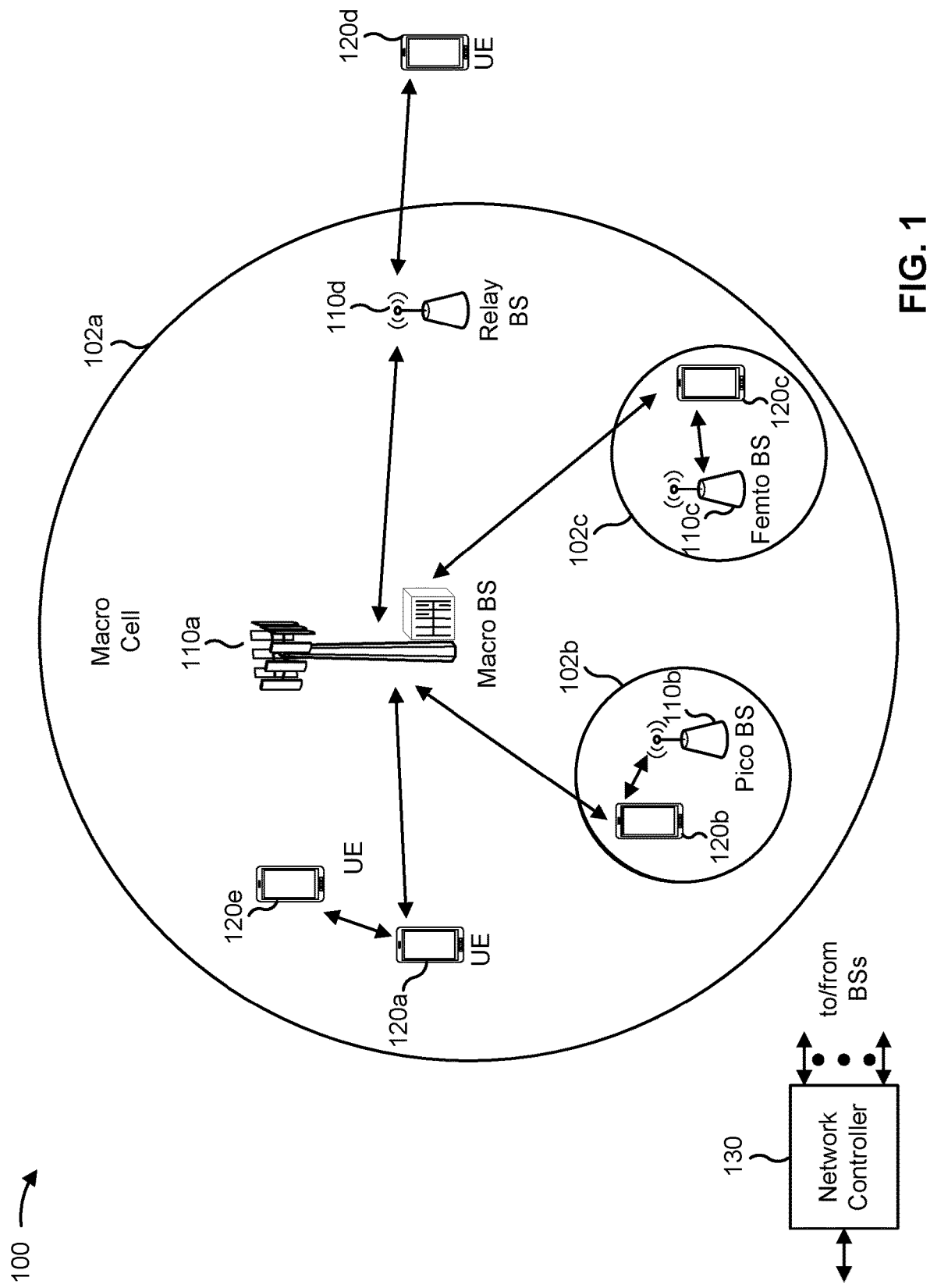
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
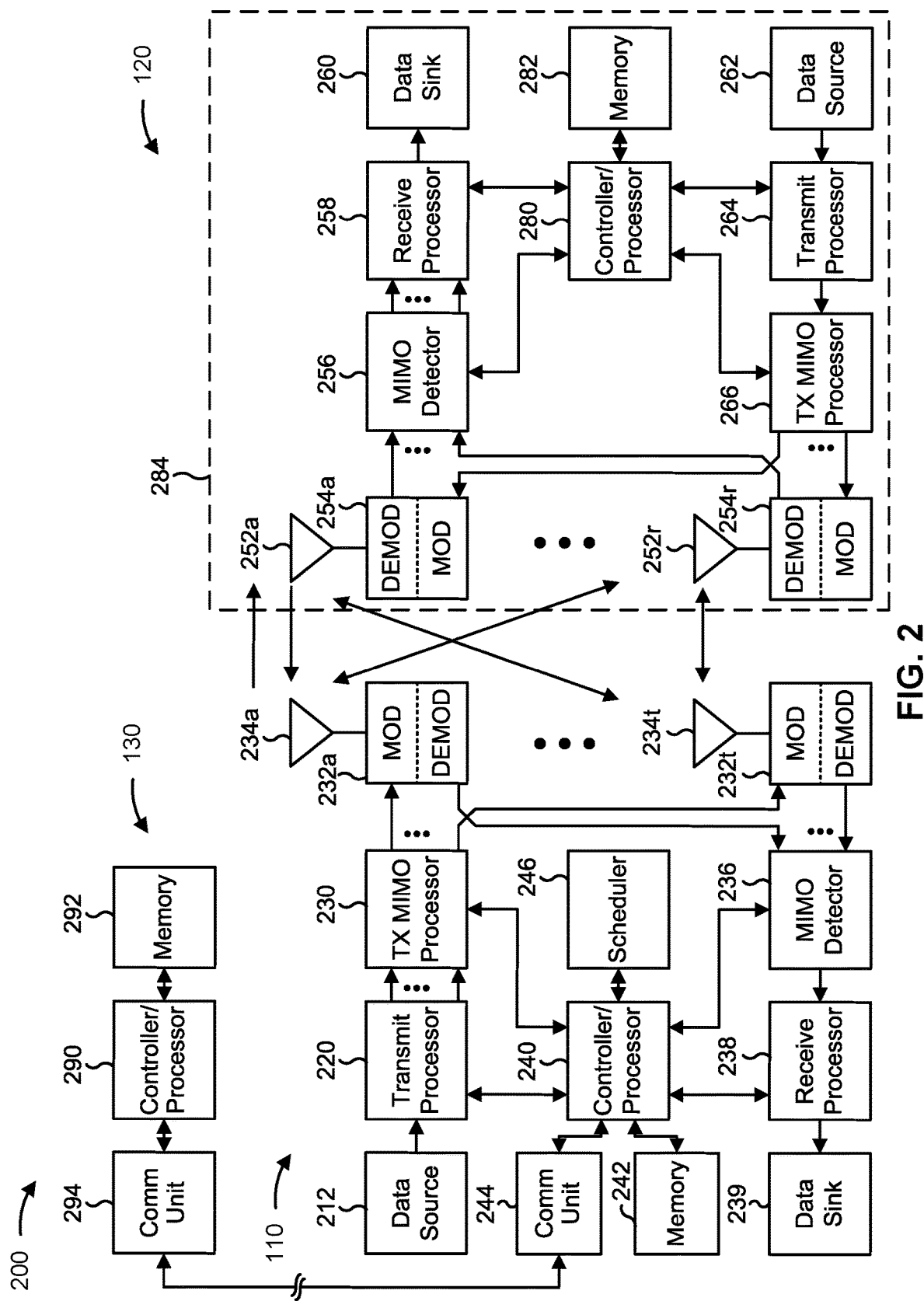
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-9.

Controller/processor 240 of base station 110, controller/processor 280 of UE 120, and/or any other component(s) of FIG. 2 may perform one or more techniques associated with joint channel state information and decoding feedback, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for determining, based at least in part on one or more decoding outcomes associated with one or more downlink communications, a resource, of a set of candidate resources, to use for transmitting a CSI report; or means for transmitting the CSI report via the resource. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for receiving a CSI report via a resource of a set of candidate resources configured for receiving the CSI report; or means for determining, based at least in part on receiving the CSI report via the resource, one or more decoding outcomes associated with one or more downlink communications. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
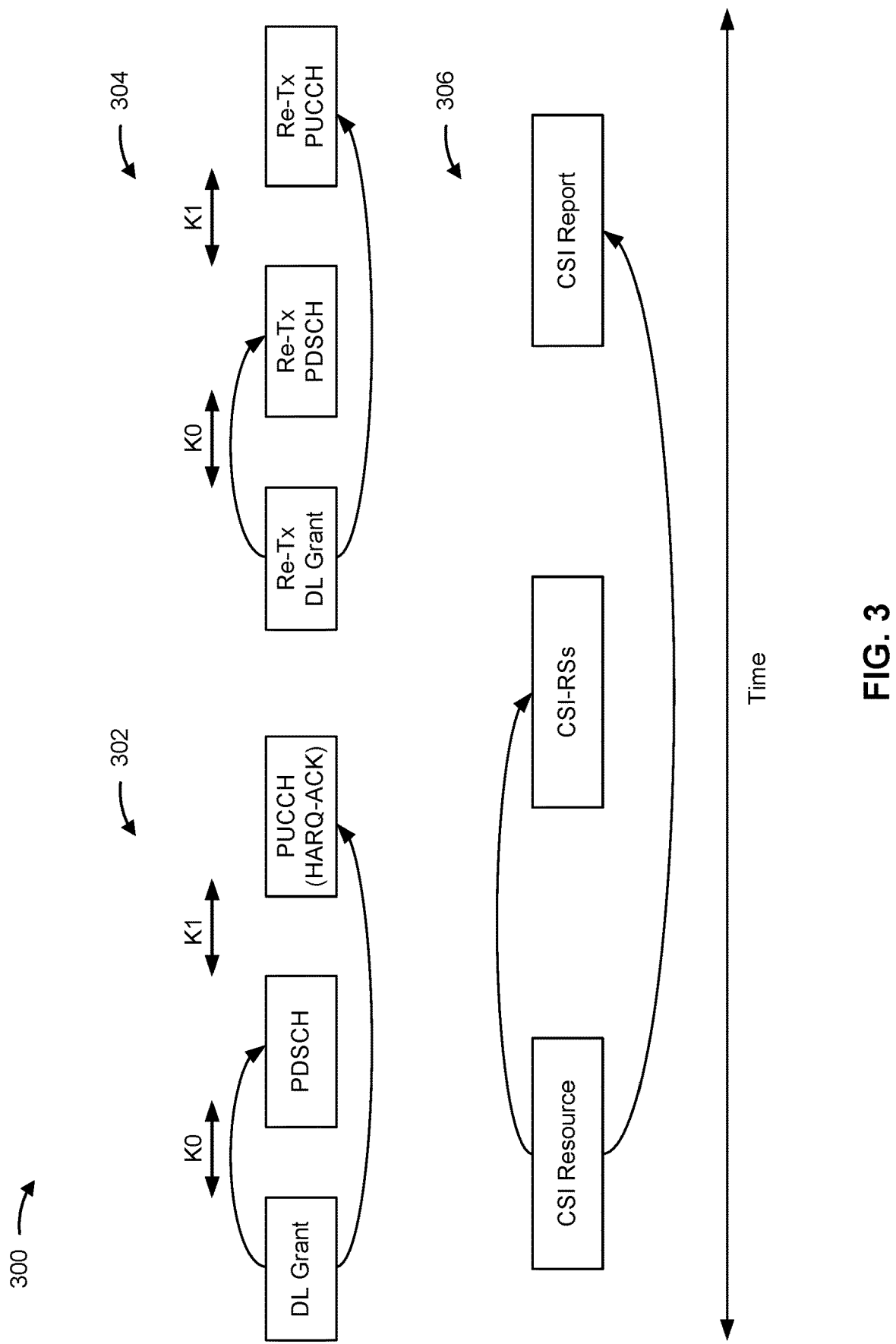
FIGS. 3-4 are diagrams illustrating examples of transmissions of decoding feedback and channel state information, in accordance with the present disclosure.

FIG. 3 is a diagram illustrating an example 300 of transmissions of decoding feedback and channel state information, in accordance with the present disclosure. As shown in FIG. 3, a UE and a base station may communicate using one or more wireless communication channels.

As shown by reference number 302, the base station may transmit, and the UE may receive, a downlink (DL) grant that schedules a physical downlink shared channel (PDSCH) and a physical uplink control channel (PUCCH). For example, a time domain resource allocation (TDRA) field of a downlink control information (DCI) message (e.g., DCI format 1_0 or 1_1, among other examples) that includes the downlink grant may indicate (e.g., implicitly) a K0 value. The K0 value may indicate an amount of time between the DCI message and resources of the PDSCH (e.g., a starting resource of the PDSCH). The DCI message may also indicate a K1 value that indicates an amount of time between the PDSCH (e.g., a last resource of the PDSCH, such as a final slot of the PDSCH) and a first resource (e.g., a first slot) of the PUCCH.

The UE may receive, or attempt to receive, the PDSCH (e.g., a downlink communication using resources of the PDSCH scheduled by the base station). For example, the UE may attempt to decode the PDSCH. Based at least in part on decoding outcomes, the UE may determine decoding feedback (e.g., hybrid automatic repeat request (HARD) acknowledgment (ACK) feedback) to transmit via the resources of the PUCCH. For example, if the UE decodes the PDSCH, the UE may transmit an ACK associated with the PDSCH via the PUCCH. If the UE fails to decode the PDSCH, the UE may transmit a negative acknowledgement (NACK) associated with the PDSCH via the PUCCH.

As shown by reference number 304, the base station may schedule a retransmission downlink grant. For example, based at least in part on the base station receiving a NACK associated with the PDSCH, the base station may transmit a re-transmission downlink grant to the UE. The re-transmission downlink grant may include a K0 value that schedules the re-transmission PDSCH and a K1 value that schedules the re-transmission PUCCH. The UE may attempt to receive and decode the re-transmission PDSCH. Based at least in part on a decoding outcome for the re-transmission PDSCH, the UE may transmit an ACK or a NACK via the re-transmission PUCCH.

As shown by reference number 306, the base station may transmit, and the UE may receive, a CSI resource that configures and/or schedules CSI reference signals (CSI-RSs) for transmission to the UE and a CSI report for transmit by the UE. The base station may transmit, and the UE may receive the CSI-RSs. The UE may measure the CSI-RSs to determine one or more metrics associated with a downlink channel. The UE may transmit a CSI report (e.g., an indication of CSI and/or CQI, among other examples) to the base station to indication parameters of the downlink channel.

As shown in FIG. 3, CSI reporting may be independent from transmissions of the PDSCH and the PUCCH. In some networks, CSI reporting may be scheduled with occurrences that are spaced with a time that is greater (e.g., with a high periodicity and/or infrequent occasions) than an interval between a PDSCH and a re-transmission PDSCH. For example, the CSI may be periodic CSI (e.g., with periodic CSI feedback and/or reporting) with a periodicity that is rigid, asynchronous CSI (e.g., with asynchronous CSI feedback and/or reporting) that may be triggered by a separate uplink grant that has a latency that is greater than a HARQ-ACK latency. Additionally, or alternatively, the HARQ-ACK may not be transmitted in a same slot as the CSI feedback.

The periodicity and/or infrequent occasions of the CSI reporting may cause a delay for the base station to modify one or more transmit parameters, such as a coding rate, an MCS, and/or a transmit power, among other examples. Based at least in part on the periodicity and/or infrequent occasions of the CSI reporting, the base station may not receive CQI and/or CSI information associated with a NACK, and the base station may not have information for modifying the one or more transmit parameters. In this way, the UE and/or the base station may consume network, power, communication, and/or computing resources based at least in part on the base station re-transmitting the PDSCH without updated CSI and/or CQI to configure the one or more transmit parameters for the re-transmission. For example, failure to configure the one or more transmit parameters based at least in part on updated CSI and/or CQI may increase a likelihood of another failed attempt to decode the PDSCH (e.g., the re-transmission PDSCH).

As indicated above, FIG. 3 is provided as an example. Other examples may differ from what is described with regard to FIG. 3.

Figure 4:
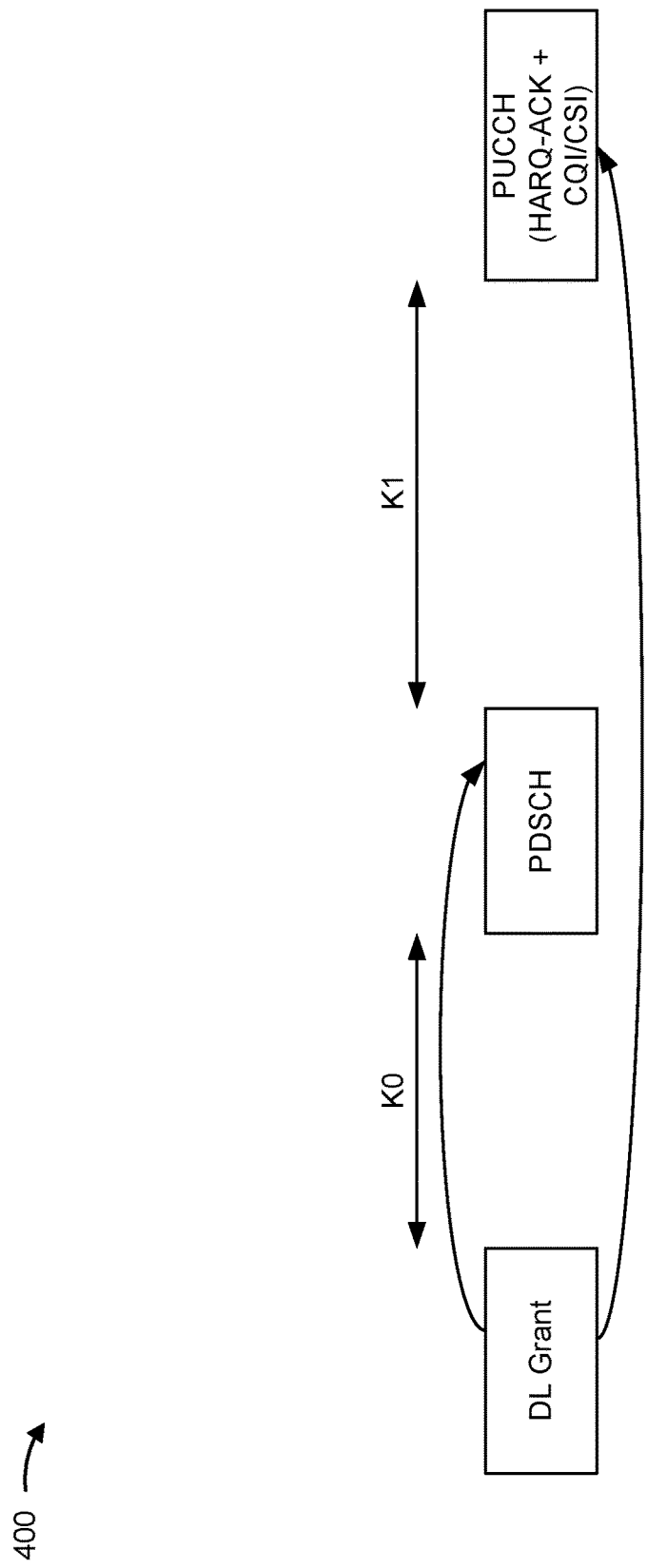

FIG. 4 is a diagram illustrating an example 400 of transmissions of decoding feedback and channel state information, in accordance with the present disclosure. As shown in FIG. 4, a UE and a base station may communicate using one or more wireless communication channels.

As shown in example 400, the base station may transmit, and the UE may receive, a downlink grant that schedules a PDSCH and a PUCCH. For example, a TDRA field of a DCI message that includes the downlink grant may indicate a K0 value. The K0 value may indicate an amount of time between the DCI message and resources of the PDSCH. The DCI message may also indicate a K1 value that indicates an amount of time between the PDSCH and a first resource of the PUCCH.

The UE may receive, or attempt to receive, the PDSCH. For example, the UE may attempt to decode the PDSCH. Based at least in part on decoding outcomes, the UE may determine decoding feedback (e.g., hybrid automatic repeat request (HARD) acknowledgment (ACK) feedback) to transmit via the resources of the PUCCH.

The UE may determine CSI and/or CQI based at least in part on measurements of a downlink communication. For example, the UE may determine the CSI and/or the CQI using reference signals (e.g., demodulation reference signals (DMRSs)) within the PDSCH (e.g., within the one or more communications received via the PDSCH).

The UE may transmit, within resources of the PUCCH (e.g., within a single PUCCH communication and/or a single PUCCH occurrence), the decoding feedback (e.g., HARQ-ACK) and the CSI and/or CQI (e.g., in a CSI report). For example, if the UE decodes the PDSCH, the UE may transmit an ACK associated with the PDSCH. If the UE fails to decode the PDSCH, the UE may transmit a negative acknowledgement (NACK) associated with the PDSCH. The UE may further transmit the CSI and/or CQI within the PUCCH. In some networks, the PUCCH may have limited resources, which may result in an incomplete report of CSI and/or CQI. In some networks, the UE may consume additional network resources to transmit a complete report of CSI and/or CQI along with the decoding feedback.

As indicated above, FIG. 4 is provided as an example. Other examples may differ from what is described with regard to FIG. 4.

In some aspects described herein, a UE may determine (e.g., select) a resource for transmitting a CSI report based at least in part on one or more decoding outcomes associated with one or more downlink communications. For example, the UE may select the resource from a first resource associated with an ACK and a second resource associated with a NACK. The UE may implicitly indicate an ACK or a NACK based at least in part on which resource the UE transmits the CSI report. In this way, the UE may conserve computing, power, network, and/or communication resources that may have otherwise been used to transmit multiple UCI messages, a stale UCI message, and/or a UCI message having an unnecessarily large number of bits.

Figure 5:
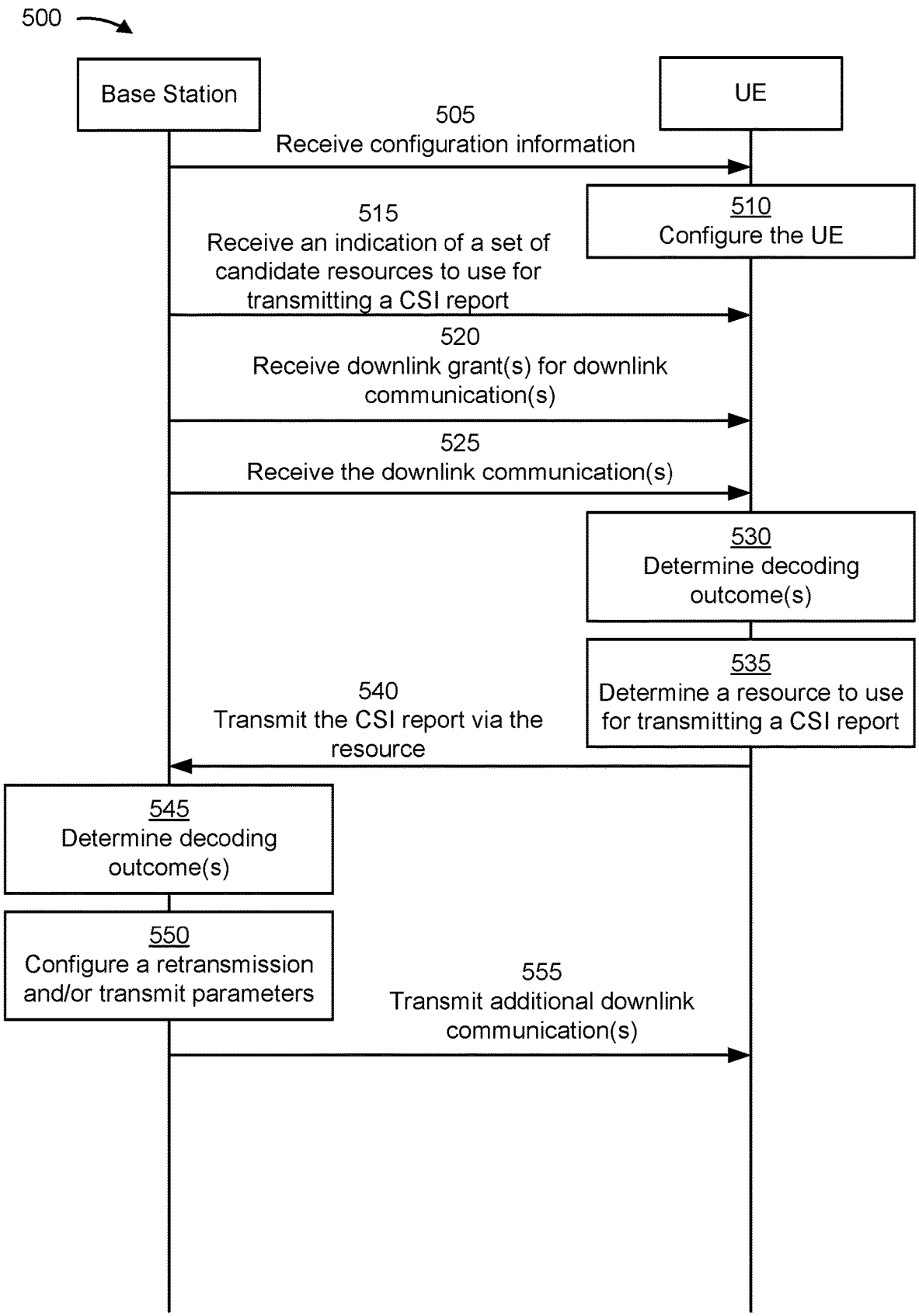
FIGS. 5-7 are diagrams illustrating examples associated with joint channel state information and decoding feedback, in accordance with the present disclosure.

FIG. 5 is a diagram illustrating an example 500 associated with joint channel state information and decoding feedback, in accordance with the present disclosure. As shown in FIG. 5, a base station (e.g., base station 110) may communicate with a UE (e.g., UE 120). In some aspects, the UE and the base station may be part of a wireless network (e.g., wireless network 100).

As shown by reference number 505, the base station may transmit, and the UE may receive, configuration information. In some aspects, the UE may receive the configuration information via one or more of radio resource control (RRC) signaling, MAC control elements (MAC CEs), and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to receive a set of candidate resources to use for transmitting a CSI report. In some aspects, the configuration information may indicate that the UE is to determine (e.g., select) a resource to use for transmitting the CSI report based at least in part on decoding outcomes for one or more downlink communications. For example, the configuration information may indicate that the UE is to transmit the CSI report via a first resource of the set of candidate resources based at least in part on a first decoding outcome (e.g., one or more ACKs), via a second resource of the set of candidate resources based at least in part on a second decoding outcome (e.g., one or more NACKs), via a third resource of the set of candidate resource based at least in part on a third decoding outcome (e.g., one or more ACKs and one or more NACKs), etc.

As shown by reference number 510, the UE may configure the UE based at least in part on the configuration information. In some aspects, the UE may be configured to perform one or more operations described herein based at least in part on the configuration information.

As shown by reference number 515, the UE may receive, and the base station may transmit, an indication of a set of candidate resources to use for transmitting a CSI report. In some aspects, the indication of the set of candidate resources may indicate associations between candidate resources of the set of candidate resources and different decoding outcomes associated with reception of one or more downlink communications. In some aspects, the set of candidate resources may include a first resource associated with all ACK decoding outcomes for the one or more downlink communications, and/or a second resource associated with all NACK decoding outcomes for the one or more downlink communications, among other examples. In some aspects, the set of candidate resources includes a third resource associated with one or more ACK decoding outcomes and one or more NACK decoding outcomes for the one or more downlink communications. In some aspects, the set of candidate resources may include a third resource associated with decoding outcomes having a first number of negative acknowledgement decoding outcomes for the one or more downlink communications (e.g., with the first number satisfying an outcome threshold), and a fourth resource associated with decoding outcomes having a second number of negative acknowledgement decoding outcomes for the one or more downlink communications (e.g., with the second number failing to satisfy the outcome threshold).

In some aspects, the outcome threshold may be based at least in part on an indication from a base station, a communication protocol, or a probability of the one or more downlink communications having decoding outcomes having a number of negative acknowledgments that satisfies the outcome threshold. For example, the outcome threshold may be based at least in part on a likelihood of having a number of NACKs in a range of one to the outcome threshold number. In some aspects, the outcome threshold may be based at least in part on having a generally equal probability (e.g., or a most equal split) of having a number of NACKs in a range from one to the outcome threshold number as having a number of NACKs in a range from the outcome threshold number to having all but one NACK for the one or more downlink communications.

In some aspects, one or more candidate resources maybe configured with a field for indicating the one or more decoding outcomes associated with the one or more downlink communications. For example, a candidate resource that is associated with having one or more ACK decoding outcomes and one or more NACK decoding outcomes for the one or more downlink communications may include a field for indicating which downlink communications are associated with a NACK and/or which downlink communications are associated with an ACK. In some aspects, a resource that is associated with having one or more ACK decoding outcomes and one or more NACK decoding outcomes for the one or more downlink communications may include (e.g., may be configured for) a two stage UCI message. The two stage UCI message may include the indications of the one or more decoding outcomes in a first stage of the UCI message and a CSI report in a second stage of the UCI message In some aspects, candidate resources of the set of candidate resources may have resources having different times, frequencies, and/or sizes. For example, a first candidate resource may include a first set of resource blocks at a first set of times and/or frequencies, a second candidate resource may include a second set of resource blocks at a second set of times and/or frequencies, and a third candidate resource may include a third set of resource blocks at a third set of times and/or frequencies, etc. In some aspects, the first set of resource blocks, the second set of resource blocks, and/or the third set of resource blocks may have different numbers of resource blocks and/or other units of resources and/or may have different sizes and/or capacities.

As shown by reference number 520, the UE may receive, and the base station may transmit, one or more downlink grants for one or more downlink communications. In some aspects, the one or more downlink grants may schedule the one or more downlink communications and/or the set of candidate resources (e.g., PUCCH resources) to use for transmitting the CSI report. For example, the one or more downlink grants may indicate K0 values and/or K1 values to schedule the one or more downlink communications and/or the set of candidate resources. In some aspects, the one or more downlink grants may have different K1 values to indicate a same time resource (e.g., a same symbol and/or slot, among other examples) for transmitting the CSI report.

As shown by reference number 525, the UE may receive, and the base station may transmit, the one or more downlink communications. In some aspects, the UE may configure one or more components of the UE to obtain one or more samples of signals detected at resources associated with the one or more downlink communications. In some aspects, the UE may receive the one or more downlink communications during different time resources.

As shown by reference number 530, the UE may determine one or more decoding outcomes associated with the one or more downlink communications. In some aspects, the UE may attempt to decode the one or more downlink communications based at least in part on samples of signals detected at resources associated with the one or more downlink communications. In some aspects, the UE may fail to decode a downlink signal based at least in part on, for example, a signal-to-noise ratio (SNR) and/or a signal-to-interference-plus-noise ratio (SINR), an MCS, an RSRP, and/or a Doppler affect, among other examples. Based at least in part on failing to decode the downlink signal, the UE may determine to indicate a NACK for the downlink communication. If the UE decodes the downlink communication, the UE may determine to indicate an ACK for the downlink communication.

As shown by reference number 535, the UE may determine a resource to use for transmitting a CSI report. In some aspects, the UE may determine to use the resource, from the set of candidate resources, to use for transmitting the CSI report based at least in part on the one or more decoding outcomes associated with the one or more downlink communications.

In some aspects, the UE may determine to use the resource based at least in part on a number of negative acknowledgment decoding outcomes associated with the one or more downlink communications and/or based at least in part on a number of acknowledgment decoding outcomes associated with the one or more downlink communications. For example, the UE may determine to use a first resource based at least in part on all of the one or more decoding outcomes being an ACK, a second resource based at least in part on all of the one or more decoding outcomes being a NACK, or a third resource based at least in part on the one or more decoding outcomes including at least one ACK and at least one NACK.

In some aspects, the resource may include a different payload size from a second resource and/or a third resource. For example, the first resource may have a smaller payload size based at least in part on the one or more decoding outcomes being one or more ACKs.

As shown by reference number 540, the UE may transmit, and the base station may receive, the CSI report via the resource. The CSI report includes CSI information, such as CSI and/or CQI, among other example parameters. In some aspects, the CSI report includes a first set of information associated with one or more decoding outcomes including zero NACKs or a second set of information associated with the one or more decoding outcomes including at least one NACK. In other words, the CSI report may include different information if zero NACKs are indicated (e.g., implicitly) than if at least one NACK is indicated. In some aspects, a CSI report associated with a first downlink communication (e.g., a portion of the CSI report associated with the first downlink communication) may include a different set of information than a CSI report associated with a second downlink communication based at least in part on the first downlink communication being associated with an ACK and the second downlink communication being associated with a NACK.

In some aspects, a CSI report associated with an ACK may include a log-likelihood ratio (LLR) quality, a CSI, an MCS, a rank, a recommended DMRS configuration, and/or a Doppler delay and/or spread, among other examples. In some aspects, a CSI report associated with a NACK may include an LLR quality, an energy metric based at least in part on LLRs, a CSI, an MCS, a best next redundancy version index, a recommended DMRS configuration, and/or a Doppler delay and/or spread, among other examples. In some aspects, the base station may use the Doppler delay and/or spread to adjust for a Doppler impact in precoding or for channel prediction and/or estimation.

As shown by reference number 545, the base station may determine the one or more decoding outcomes associated with the one or more downlink communications based at least in part on the resource over which the base station receives the CSI report. In some aspects, the base station may determine that all decoding outcomes are ACKs based at least in part on receiving the CSI report via a first resource, that all decoding outcomes are NACKs based at least in part on receiving the CSI report via a second resource, and/or that the one or more decoding outcomes include at least one ACK and at least one NACK based at least in part on receiving the CSI report via a third resource or a fourth resource. In some aspects, the base station may determine the one or more decoding outcomes based at least in part on the CSI report including an indication of which downlink communications are associated with ACKs and which downlink communications are associated with NACKs (e.g., if the resource indicates that the one or more decoding outcomes include at least one ACK and at least one NACK).

As shown by reference number 555, the UE may receive, and the base station may transmit, one or more additional downlink communications. In some aspects, the base station may modify one or more transmit parameters based at least in part on the CSI report and/or whether the one or more decoding outcomes included a NACK. For example, the base station may modify a transmit power, a transmit beam, and/or an MCS, among other examples.

Based at least in part on the UE determining (e.g., selecting) a resource for transmitting a CSI report based at least in part on one or more decoding outcomes associated with one or more downlink communications, the UE may implicitly indicate one or more ACKs and/or one or more NACKs based at least in part on which resource the UE transmits the CSI report. In this way, the UE may conserve computing, power, network, and/or communication resources that may have otherwise been used to transmit multiple UCI messages, a stale UCI message, and/or a UCI message having an unnecessarily large number of bits.

As indicated above, FIG. 5 is provided as an example. Other examples may differ from what is described with regard to FIG. 5.

Figure 6:
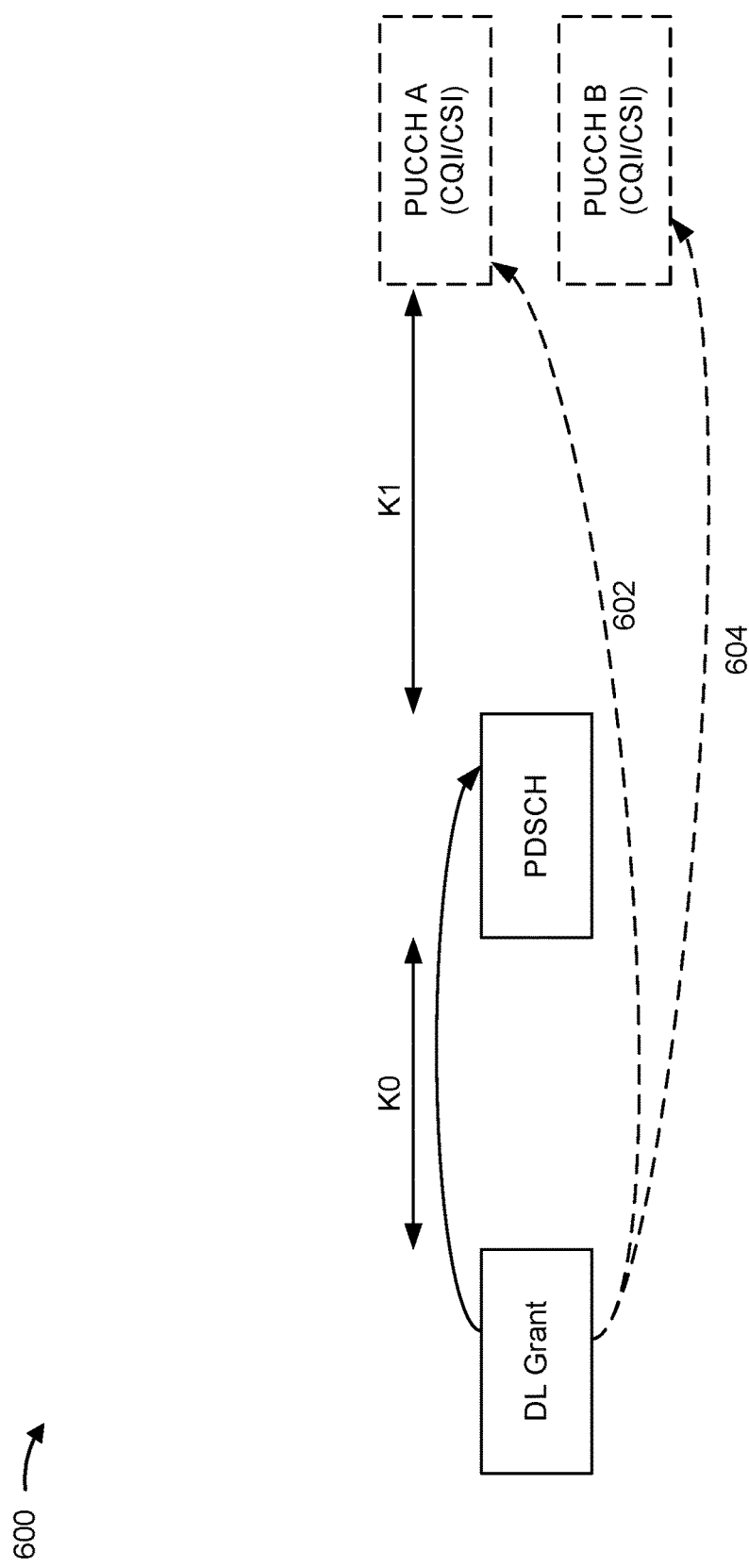

FIG. 6 is a diagram illustrating an example 600 associated with joint channel state information and decoding feedback, in accordance with the present disclosure. As shown in FIG. 6, a base station (e.g., base station 110) may communicate with a UE (e.g., UE 120). In some aspects, the UE and the base station may be part of a wireless network (e.g., wireless network 100).

As shown in example 600, the base station may transmit, and the UE may receive, a downlink grant that schedules a PDSCH and a PUCCH. For example, a TDRA field of a DCI message that includes the downlink grant may indicate a K0 value. The K0 value may indicate an amount of time between the DCI message and resources of the PDSCH. The DCI message may also indicate a K1 value that indicates an amount of time between the PDSCH and a first resource of the PUCCH.

The UE may receive, or attempt to receive, the PDSCH. For example, the UE may attempt to decode the PDSCH. Based at least in part on decoding outcomes, the UE may determine decoding feedback (e.g., hybrid automatic repeat request (HARD) acknowledgment (ACK) feedback) to transmit via the resources of the PUCCH.

The UE may determine CSI and/or CQI based at least in part on measurements of a downlink communication. For example, the UE may determine the CSI and/or the CQI using reference signals (e.g., demodulation reference signals (DMRSs)) within the PDSCH (e.g., within the one or more communications received via the PDSCH).

As shown by reference number 602, the downlink grant may configure a resource PUCCH A for transmission of the CSI report (e.g., CQI and/or CSI, among other examples). As shown by reference number 604, the downlink grant may configure a resource PUCCH B for transmission of the CSI report (e.g., CQI and/or CSI, among other examples). In some aspects, the downlink grant may implicitly indicate the resource PUCCH A and the resource PUCCH B (e.g., based at least in part on positions within the payload of the downlink grant) and/or may indicate the resource PUCCH A and the resource PUCCH B based at least in part on configuration information and/or a communication protocol (e.g., indicating locations of the resource PUCCH A and the resource PUCCH B based at least in part on the K1 value). In some aspects, the downlink grant, configuration information, and/or the communication protocol may indicate whether the PUCCH A or the PUCCH B is associated with an ACK for the PDSCH and whether the PUCCH A or the PUCCH B is associated with an ACK for the PDSCH.

The UE may transmit the resource PUCCH A and the resource PUCCH B within the resources PUCCH A (e.g., within a single PUCCH communication and/or a single PUCCH occurrence) based at least in part on a first decoding outcome (e.g., an ACK) or within the resource PUCCH B based at least in part on a second decoding outcome (e.g., a NACK). In other words, the UE may transmit the CSI report on a resource corresponding to a decoding outcome of the PDSCH. In some aspects, the PUCCH A may have a different payload size than the PUCCH B.

As indicated above, FIG. 6 is provided as an example. Other examples may differ from what is described with regard to FIG. 6.

Figure 7:
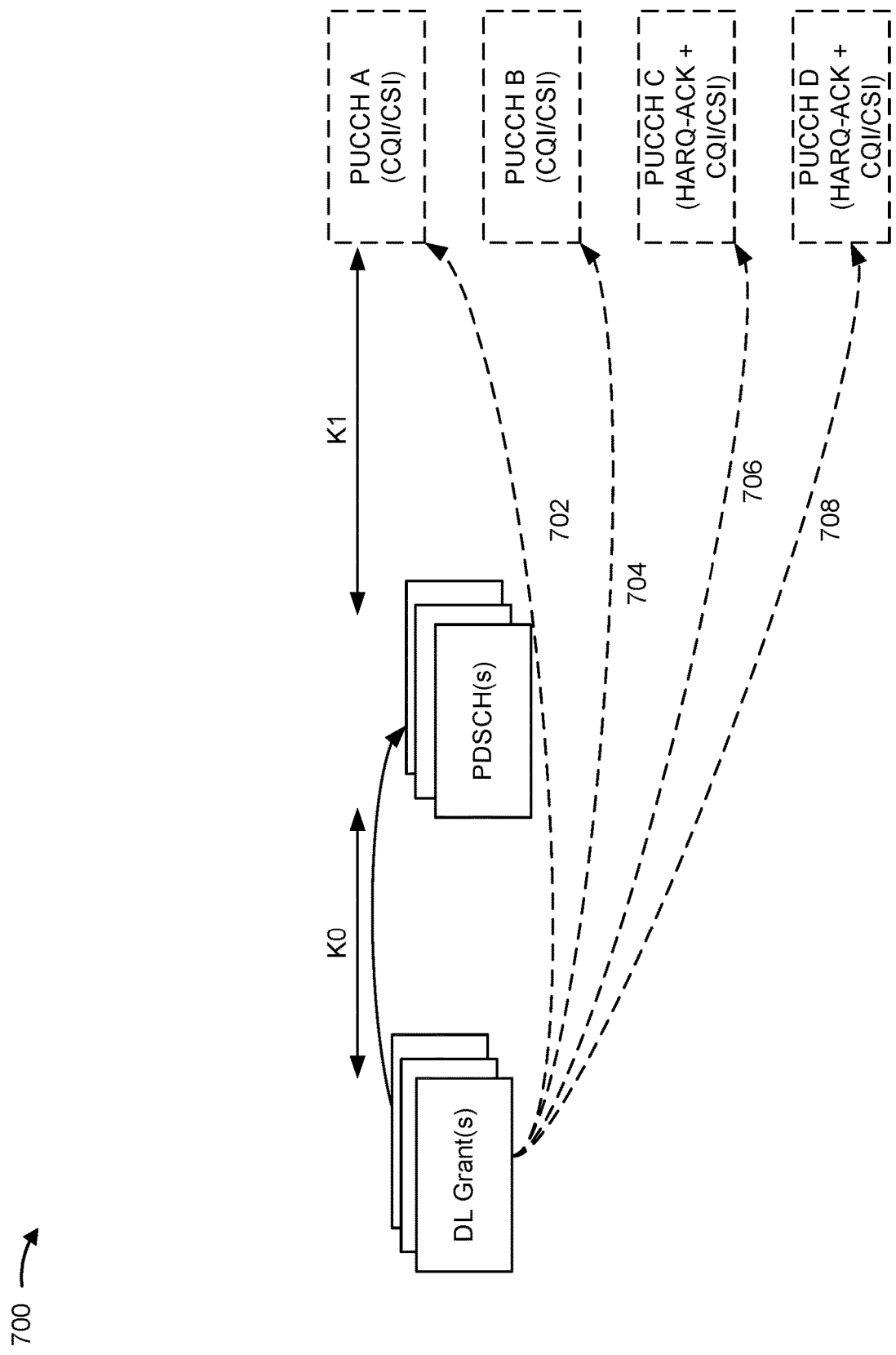

FIG. 7 is a diagram illustrating an example 700 associated with joint channel state information and decoding feedback, in accordance with the present disclosure. As shown in FIG. 7, a base station (e.g., base station 110) may communicate with a UE (e.g., UE 120). In some aspects, the UE and the base station may be part of a wireless network (e.g., wireless network 100).

As shown in example 700, the base station may transmit, and the UE may receive, downlink grants that schedule MPDSCHs (e.g., downlink communications via resources of one or more PDSCHs) and a PUCCH (e.g., a set of candidate PUCCH resources for selection based at least in part on decoding outcomes). For example, TDRA fields of DCI messages that include the downlink grants may indicate K0 values. The K0 values may indicate amounts of time between the DCI messages and resources of the PDSCHs. The DCI messages may also indicate K1 values that indicate amounts of time between the PDSCHs and a first resource of the PUCCH. In some aspects, the base station may configure the K1 values to indicate a same time for the PUCCH for each of the PDSCHs. In some aspects, the UE may be configured to transmit PUCCH for each of the PDSCHs based at least in part on a semiconductor-persistent scheduling collision, blocked feedback, and/or the K1 values, among other examples. In some aspects, the PUCCH may include MHARQ-ACK messages.

The UE may receive, or attempt to receive, the PDSCHs. For example, the UE may attempt to decode the PDSCHs. Based at least in part on decoding outcomes, the UE may determine decoding feedback (e.g., associated with each of the PDSCHs) to transmit via the resources of the PUCCH.

The UE may determine CSI and/or CQI based at least in part on measurements of a downlink communication. For example, the UE may determine the CSI and/or the CQI using reference signals (e.g., demodulation reference signals (DMRSs)) within the PDSCH (e.g., within the one or more communications received via the PDSCH).

As shown by reference number 702, the downlink grant may configure a resource PUCCH A for transmission of the CSI report (e.g., CQI and/or CSI, among other examples). As shown by reference number 704, the downlink grant may configure a resource PUCCH B for transmission of the CSI report (e.g., CQI and/or CSI, among other examples). As shown by reference number 706, the downlink grant may configure a resource PUCCH C for transmission of the CSI report (e.g., CQI and/or CSI, among other examples). As shown by reference number 708, the downlink grant may configure a resource PUCCH D for transmission of the CSI report (e.g., CQI and/or CSI, among other examples).

In some aspects, the base station may configure the UE to transmit a CSI with size $M*K\_N$ bits via PUCCH A when all NACKs are observed, where $K\_N$ is a number of bits used to transmit CSI for a NACK. In some aspects, the base station may configure the UE to transmit a CSI with size $M*K\_A$ bits via PUCCH B when all ACKs are observed, where $K\_A$ is a number of bits used to transmit CSI for an ACK. In some aspects, the base station may configure the UE to transmit a CSI with size $M+A*K\_A+N*K\_N$ bits via PUCCH C when at least one ACK and at least one NACK are observed, where A is a number of ACKs observed and B is a number of NACKs observed.

In some aspects, the base station may configure a PUCCH resource having higher probability events (e.g., if ACK has a higher probability, the ACK/ACK/ACK combination has the highest prob) may be assigned more time and/or frequency allocations to provide a higher reliability and improved detection at the base station.

In some aspects with 2 or more feedback packets (e.g., an accumulated feedback packet), the base station may configure PUCCH A, PUCCH B, and PUCCH C. The PUCCH A may be associated with all NACKs, the PUCCH B may be associated with all ACKS, and PUCCH C may be associated with a mix of ACKs and NACKs. For example, when M=3, the PUCCH C may be associated with decoding outcomes of NACK/NACK/ACK, NACK/ACK/NACK, ACK/NACK/NACK, NACK/ACK/ACK, ACK/NACK/ACK, and ACK/ACK/NACK. The UE may be configured to append MHARQ-ACK packets to the CSI report for PUCCH C to indicate which downlink communications are associated with which decoding outcome. The UE may use a bitmap to indicate which downlink communications are associated with which decoding outcome and/or may use a binary value to indicate which of the outcomes (e.g., the 6 outcomes described above) were observed. In some aspects, the base station and the UE may agree to the bitmap and/or the binary values, along with orders of the PDSCHs. In some aspects, the UE and the base station may agree to use a regular counting system from 0 to $2^{(M-1)}$ and replace each 0 by NACK and each 1 by ACK.

In some aspects, the base station may configure $K\_A=K\_N=K$ to fix payload sizes of the PUCCH A and the PUCCH B. In some aspects, the base station may configure a two stage UCI per PUCCH resource (e.g., having ACK/NACK as stage 1 and CSI as stage 2). The stage 1 and the stage 2 may be split using time division multiplexing or frequency division multiplexing.

In some aspects with 2 or more feedback packets (e.g., an accumulated feedback packet), the base station may configure PUCCH A, PUCCH B, PUCCH C, and PUCCH D. The PUCCH A may be associated with all NACKs, the PUCCH B may be associated with all ACKS, PUCCH C may be associated with a mix of ACKs and NACKs with a number of NACKs satisfies an outcome threshold, and PUCCH D may be associated with a mix of ACKs and NACKs with a number of NACKs fails to satisfy the outcome threshold. For example, when M=3, the PUCCH C may be associated with decoding outcomes of NACK/NACK/ACK, NACK/ACK/NACK, and ACK/NACK/NACK (e.g., having 2 NACKs). PUCCH D may be associated with decoding outcomes of NACK/ACK/ACK, ACK/NACK/ACK, and ACK/ACK/NACK (e.g., having 1 NACK). The UE may be configured to append MHARQ-ACK packets to the CSI report for PUCCH C and PUCCH D to indicate which downlink communications are associated with which decoding outcome. The UE may use a bitmap to indicate which downlink communications are associated with which decoding outcome and/or may use a binary value (e.g., having 2 bits) to indicate which of the outcomes (e.g., the 3 outcomes for each of PUCCH C or PUCCH D described above) were observed when using PUCCH C or PUCCH D. In some aspects, the UE may include no explicit ACK/NACK indications when using PUCCH A or PUCCH B.

Similarly, when M>3, the UE may use 4 PUCCH resources where PUCCH A indicates (e.g., implicitly) all-ACKs and PUCCH B indicates (e.g., implicitly) all NACKs. PUCCH C and PUCCH D may indicate a mix of ACKs and NACKs, and may include HARQ-ACK bits and CSI feedback. For example, PUCCH C may use used when a number of ACKs satisfies an outcome threshold (e.g., more ACKs than NACKs) and PUCCH D may be used when a number of ACKs fails to satisfy the outcome threshold (e.g., more NACKs than ACKs). In some aspects, a probability of an ACK is higher than a probability of a NACK, and the outcome threshold is set based at least in part on the probability of observing an ACK. For example, PUCCH C may be used for indicating combinations of decoding outcomes having highest probabilities and PUCCH D may be used for indicating remaining outcomes. In this way, the most likely combinations may be reported with a reduced number of bits (e.g., based at least in part on having fewer candidate combinations).

In some aspects, the base station may configure content for the different PUCCH resources (e.g., based at least in part on traffic and/or channel conditions). In some aspects, the base station and/or the UE may configure the PUCCH A for decoding outcomes where a number of ACKs A=0, the PUCCH B for decoding outcomes where a number of ACKs A=M, the PUCCH C for decoding outcomes where a number of ACKs A—{M−1, M−2, . . . , M−r}, and the PUCCH D for decoding outcomes where a number of ACKs A={remaining combinations}. The base station may explicitly indicate the content for the different PUCCH resources and/or may indicate r using, for example, RRC signaling and/or agreeing that a set of outcomes indicated via PUCCH C includes A=M−1.

As indicated above, FIG. 7 is provided as an example. Other examples may differ from what is described with regard to FIG. 7.

Figure 8:
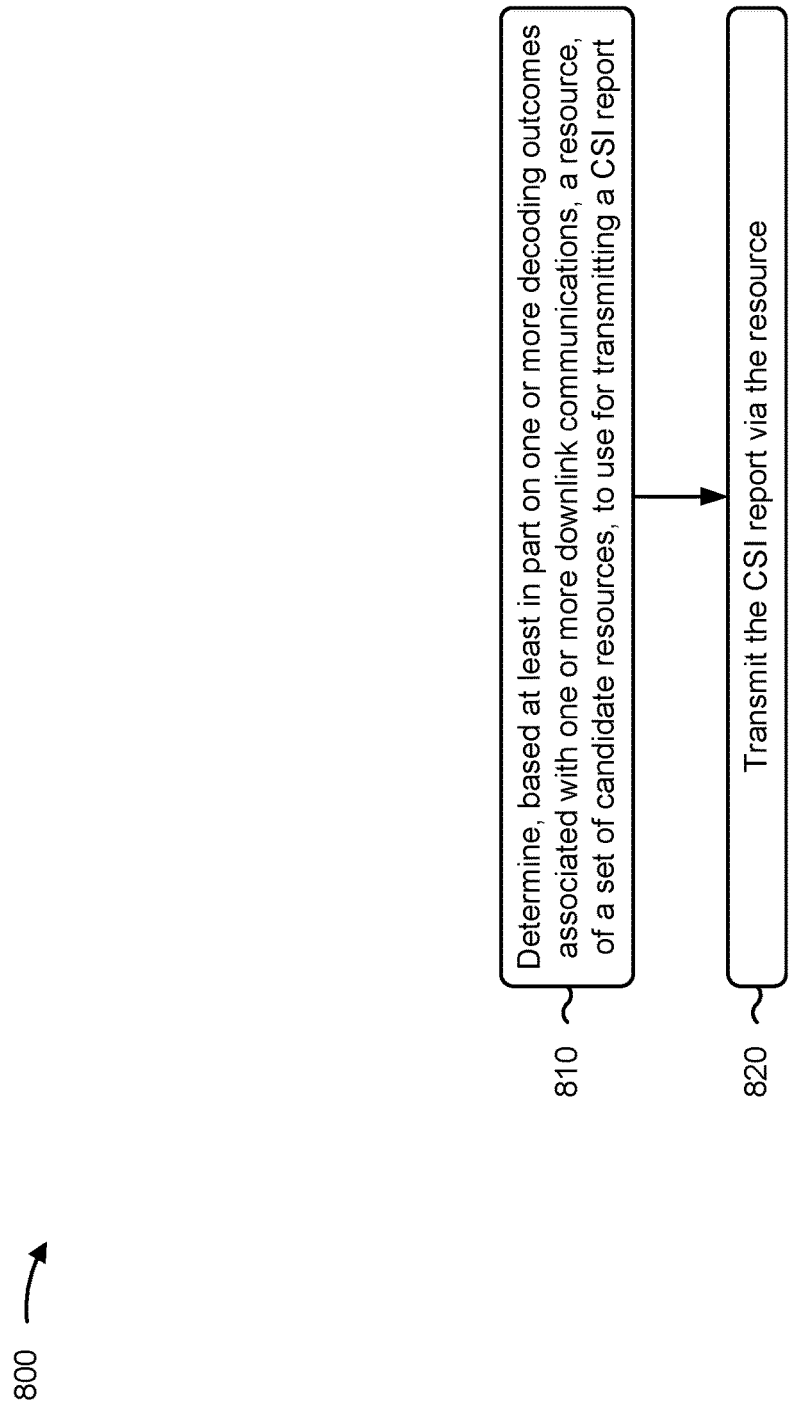
FIGS. 8 and 9 are diagrams illustrating example processes associated with joint channel state information and decoding feedback, in accordance with the present disclosure.

FIG. 8 is a diagram illustrating an example process 800 performed, for example, by a UE, in accordance with the present disclosure. Example process 800 is an example where the UE (e.g., UE 120) performs operations associated with joint channel state information and decoding feedback.

As shown in FIG. 8, in some aspects, process 800 may include determining, based at least in part on one or more decoding outcomes associated with one or more downlink communications, a resource, of a set of candidate resources, to use for transmitting a CSI report (block 810). For example, the UE (e.g., using communication manager 1008, depicted in FIG. 10) may determine, based at least in part on one or more decoding outcomes associated with one or more downlink communications, a resource, of a set of candidate resources, to use for transmitting a CSI report, as described above.

As further shown in FIG. 8, in some aspects, process 800 may include transmitting the CSI report via the resource (block 820). For example, the UE (e.g., using transmission component 1004, depicted in FIG. 10) may transmit the CSI report via the resource, as described above.

Process 800 may include additional aspects, such as any single aspect or any combination of aspects described below and/or in connection with one or more other processes described elsewhere herein.

In a first aspect, transmitting the CSI report via the resource indicates the one or more decoding outcomes associated with the one or more downlink communications.

In a second aspect, alone or in combination with the first aspect, a payload size of the CSI report is based at least in part on the one or more decoding outcomes.

In a third aspect, alone or in combination with one or more of the first and second aspects, determining the resource of the set of candidate resources comprises one or more of determining the resource based at least in part on a number of negative acknowledgment decoding outcomes associated with the one or more downlink communications, or determining the resource based at least in part on a number of acknowledgment decoding outcomes associated with the one or more downlink communications.

In a fourth aspect, alone or in combination with one or more of the first through third aspects, process 800 includes receiving an indication of the set of candidate resources for selection based at least in part on the one or more decoding outcomes associated with the one or more downlink communications.

In a fifth aspect, alone or in combination with one or more of the first through fourth aspects, the set of candidate resources comprises one or more of a first resource associated with all acknowledgement decoding outcomes for the one or more downlink communications, a second resource associated with all negative acknowledgement decoding outcomes for the one or more downlink communications, or a third resource associated with one or more acknowledgement decoding outcomes and one or more negative acknowledgement decoding outcomes for the one or more downlink communications.

In a sixth aspect, alone or in combination with one or more of the first through fifth aspects, the third resource is configured with a field for indicating the one or more decoding outcomes associated with the one or more downlink communications, and wherein transmitting the CSI report via the resource comprises transmitting the CSI report and indications of the one or more decoding outcomes via the third resource.

In a seventh aspect, alone or in combination with one or more of the first through sixth aspects, the third resource comprises a two stage uplink control information (UCI) message that includes the indications of the one or more decoding outcomes in a first stage of the UCI message and that includes the CSI report in a second stage of the UCI message.

In an eighth aspect, alone or in combination with one or more of the first through seventh aspects, the set of candidate resources comprises one or more of a first resource associated with all acknowledgement decoding outcomes for the one or more downlink communications, a second resource associated with all negative acknowledgement decoding outcomes for the one or more downlink communications, a third resource associated with decoding outcomes having a first number of negative acknowledgement decoding outcomes for the one or more downlink communications, wherein the first number satisfies an outcome threshold, and a fourth resource associated with decoding outcomes having a second number of negative acknowledgement decoding outcomes for the one or more downlink communications, wherein the second number fails to satisfy the outcome threshold.

In a ninth aspect, alone or in combination with one or more of the first through eighth aspects, one or more of the third resource or the fourth resource are configured with a field for indicating the one or more decoding outcomes associated with the one or more downlink communications, and wherein transmitting the CSI report via the resource comprises transmitting the CSI report and indications of the one or more decoding outcomes via the third resource or the fourth resource.

In a tenth aspect, alone or in combination with one or more of the first through ninth aspects, the outcome threshold is based at least in part on one or more of an indication from a base station, or a probability of the one or more downlink communications having decoding outcomes having a number of negative acknowledgments that satisfies the outcome threshold.

In an eleventh aspect, alone or in combination with one or more of the first through tenth aspects, the CSI report includes a first set of information associated with the one or more decoding outcomes including zero negative acknowledgments, or wherein the CSI report includes a second set of information associated with the one or more decoding outcomes including at least one negative acknowledgment.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
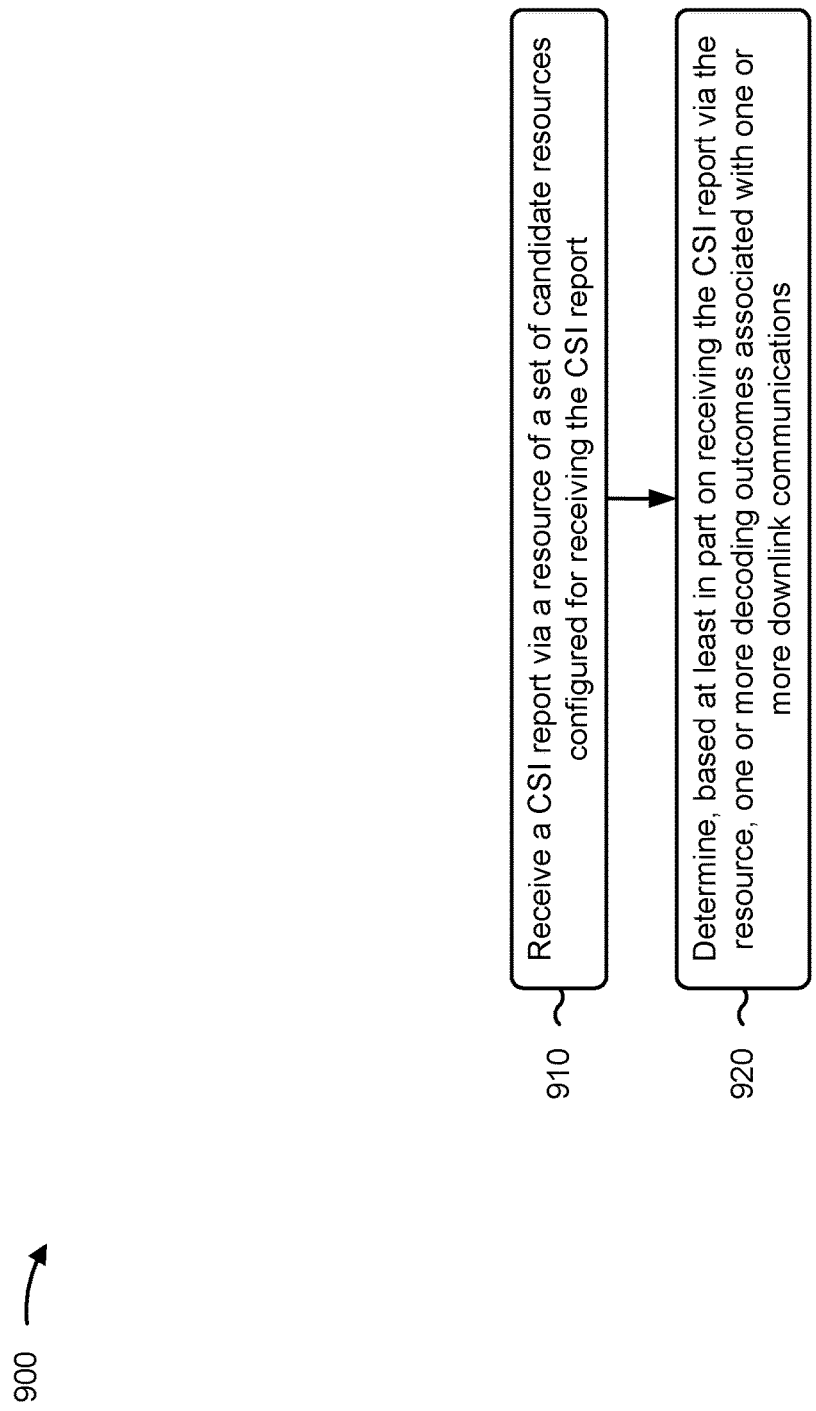

FIG. 9 is a diagram illustrating an example process 900 performed, for example, by a base station, in accordance with the present disclosure. Example process 900 is an example where the base station (e.g., base station 110) performs operations associated with joint channel state information and decoding feedback.

As shown in FIG. 9, in some aspects, process 900 may include receiving a CSI report via a resource of a set of candidate resources configured for receiving the CSI report (block 910). For example, the base station (e.g., using reception component 1102, depicted in FIG. 11) may receive a CSI report via a resource of a set of candidate resources configured for receiving the CSI report, as described above.

As further shown in FIG. 9, in some aspects, process 900 may include determining, based at least in part on receiving the CSI report via the resource, one or more decoding outcomes associated with one or more downlink communications (block 920). For example, the base station (e.g., using communication manager 1108, depicted in FIG. 11) may determine, based at least in part on receiving the CSI report via the resource, one or more decoding outcomes associated with one or more downlink communications, as described above.

Process 900 may include additional aspects, such as any single aspect or any combination of aspects described below and/or in connection with one or more other processes described elsewhere herein.

In a first aspect, receiving the CSI report via the resource indicates the one or more decoding outcomes associated with the one or more downlink communications.

In a second aspect, alone or in combination with the first aspect, a payload size of the CSI report is based at least in part on the one or more decoding outcomes.

In a third aspect, alone or in combination with one or more of the first and second aspects, determining the one or more decoding outcomes comprises one or more of determining, based at least in part on receiving the CSI report via the resource, a number of negative acknowledgment decoding outcomes associated with the one or more downlink communications, or determining, based at least in part on receiving the CSI report via the resource, a number of acknowledgment decoding outcomes associated with the one or more downlink communications.

In a fourth aspect, alone or in combination with one or more of the first through third aspects, process 900 includes transmitting an indication of the set of candidate resources for selection, by a receiver device, based at least in part on the one or more decoding outcomes associated with the one or more downlink communications.

In a fifth aspect, alone or in combination with one or more of the first through fourth aspects, the set of candidate resources comprises one or more of a first resource associated with all acknowledgement decoding outcomes for the one or more downlink communications, a second resource associated with all negative acknowledgement decoding outcomes for the one or more downlink communications, or a third resource associated with one or more acknowledgement decoding outcomes and one or more negative acknowledgement decoding outcomes for the one or more downlink communications.

In a sixth aspect, alone or in combination with one or more of the first through fifth aspects, the third resource is configured with a field for indicating the one or more decoding outcomes associated with the one or more downlink communications, and wherein receiving the CSI report via the resource comprises receiving the CSI report and indications of the one or more decoding outcomes via the third resource.

In a seventh aspect, alone or in combination with one or more of the first through sixth aspects, the third resource comprises a two stage uplink control information (UCI) message that includes the indications of the one or more decoding outcomes in a first stage of the UCI message and that includes the CSI report in a second stage of the UCI message.

In an eighth aspect, alone or in combination with one or more of the first through seventh aspects, the set of candidate resources comprises one or more of a first resource associated with all acknowledgement decoding outcomes for the one or more downlink communications, a second resource associated with all negative acknowledgement decoding outcomes for the one or more downlink communications, a third resource associated with decoding outcomes having a first number of negative acknowledgement decoding outcomes for the one or more downlink communications, wherein the first number satisfies an outcome threshold, and a fourth resource associated with decoding outcomes having a second number of negative acknowledgement decoding outcomes for the one or more downlink communications, wherein the second number fails to satisfy the outcome threshold.

In a ninth aspect, alone or in combination with one or more of the first through eighth aspects, one or more of the third resource or the fourth resource are configured with a field for indicating the one or more decoding outcomes associated with the one or more downlink communications, and wherein receiving the CSI report via the resource comprises transmitting the CSI report and indications of the one or more decoding outcomes via the third resource or the fourth resource.

In a tenth aspect, alone or in combination with one or more of the first through ninth aspects, the outcome threshold is based at least in part on one or more of an indication transmitted to a receiver device, or a probability of the one or more downlink communications having decoding outcomes having a number of negative acknowledgments that satisfies the outcome threshold.

In an eleventh aspect, alone or in combination with one or more of the first through tenth aspects, the CSI report includes a first set of information associated with the one or more decoding outcomes including zero negative acknowledgments, or wherein the CSI report includes a second set of information associated with the one or more decoding outcomes including at least one negative acknowledgment.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
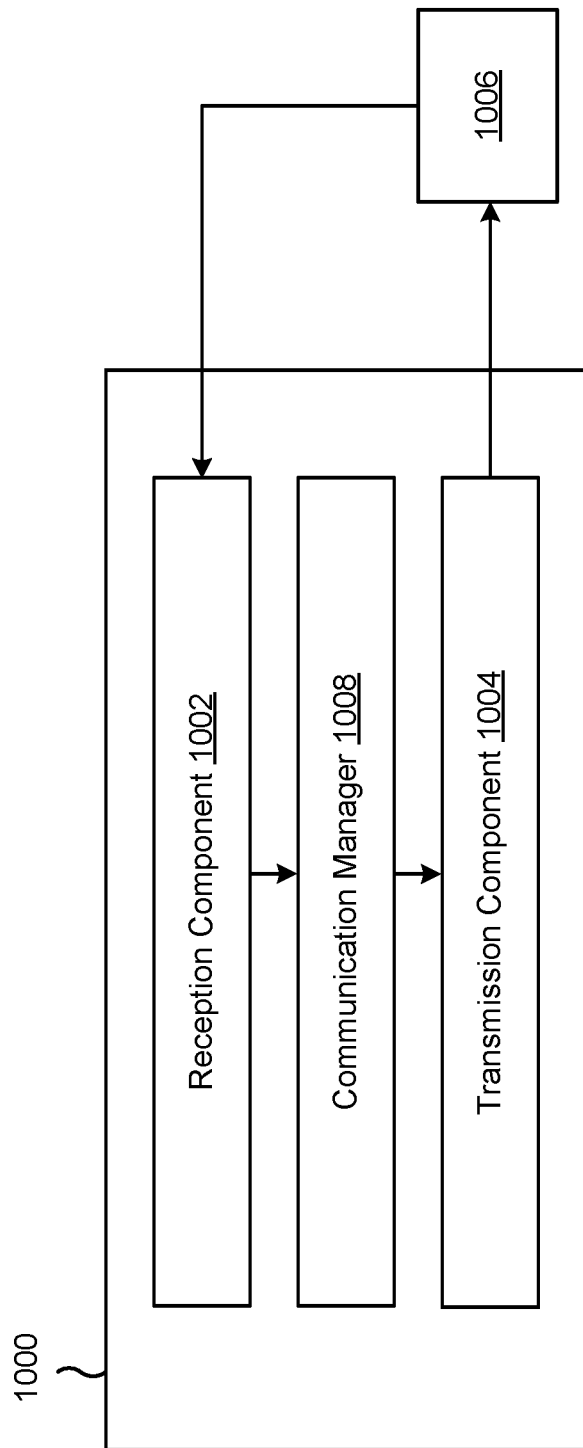
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The communication manager 1008 may determine, based at least in part on one or more decoding outcomes associated with one or more downlink communications, a resource, of a set of candidate resources, to use for transmitting a CSI report. The transmission component 1004 may transmit the CSI report via the resource.

The reception component 1002 may receive an indication of the set of candidate resources for selection based at least in part on the one or more decoding outcomes associated with the one or more downlink communications.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
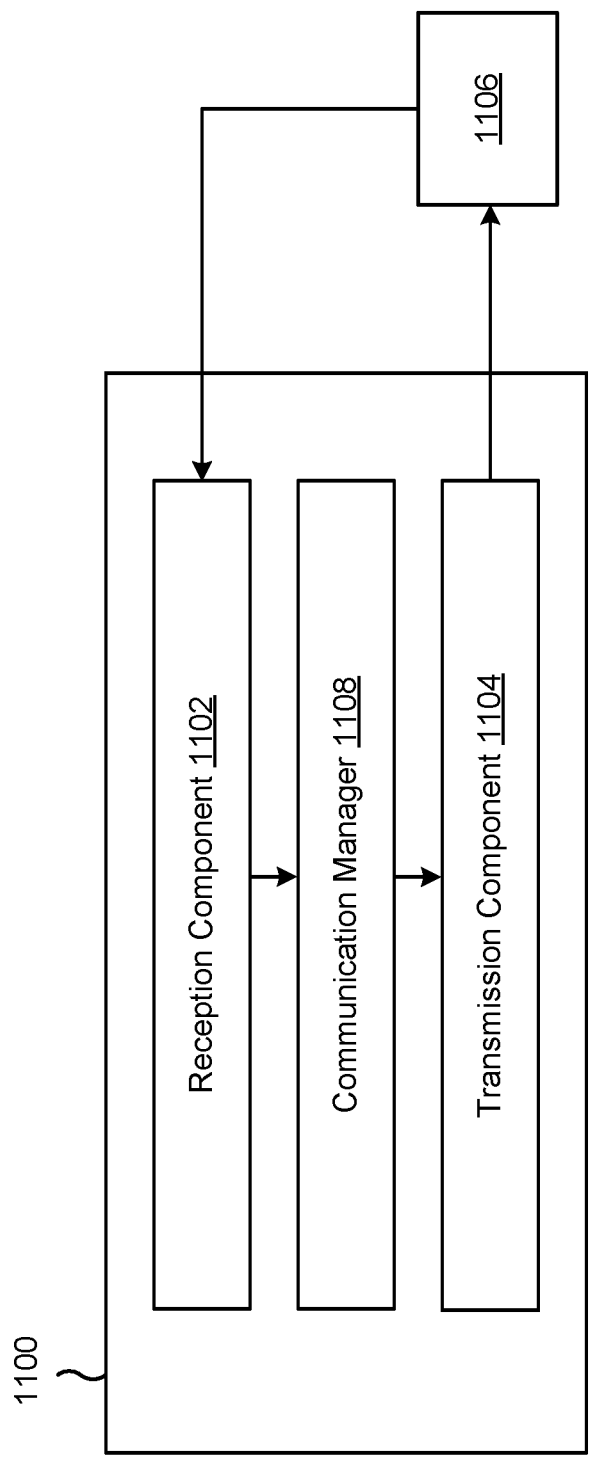

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108.

In some aspects, the apparatus 1100 may be configured to perform one or more operations described herein in connection with FIG. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The reception component 1102 may receive a CSI report via a resource of a set of candidate resources configured for receiving the CSI report. The communication manager 1108 may determine, based at least in part on receiving the CSI report via the resource, one or more decoding outcomes associated with one or more downlink communications.

The transmission component 1104 may transmit an indication of the set of candidate resources for selection based at least in part on the one or more decoding outcomes associated with the one or more downlink communications.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: determining, based at least in part on one or more decoding outcomes associated with one or more downlink communications, a resource, of a set of candidate resources, to use for transmitting a channel state information (CSI) report; and transmitting the CSI report via the resource.

Aspect 2: The method of Aspect 1, wherein transmitting the CSI report via the resource indicates the one or more decoding outcomes associated with the one or more downlink communications.

Aspect 3: The method of any of Aspects 1-2, wherein a payload size of the CSI report is based at least in part on the one or more decoding outcomes.

Aspect 4: The method of any of Aspects 1-3, wherein determining the resource of the set of candidate resources comprises one or more of: determining the resource based at least in part on a number of negative acknowledgment decoding outcomes associated with the one or more downlink communications, or determining the resource based at least in part on a number of acknowledgment decoding outcomes associated with the one or more downlink communications.

Aspect 5: The method of any of Aspects 1-3, further comprising: receiving an indication of the set of candidate resources for selection based at least in part on the one or more decoding outcomes associated with the one or more downlink communications.

Aspect 6: The method of any of Aspects 1-4, wherein the set of candidate resources comprises one or more of: a first resource associated with all acknowledgement decoding outcomes for the one or more downlink communications, a second resource associated with all negative acknowledgement decoding outcomes for the one or more downlink communications, or a third resource associated with one or more acknowledgement decoding outcomes and one or more negative acknowledgement decoding outcomes for the one or more downlink communications.

Aspect 7: The method of Aspect 6, wherein the third resource is configured with a field for indicating the one or more decoding outcomes associated with the one or more downlink communications, and wherein transmitting the CSI report via the resource comprises transmitting the CSI report and indications of the one or more decoding outcomes via the third resource.

Aspect 8: The method of Aspect 7, wherein the third resource comprises a two stage uplink control information (UCI) message that includes the indications of the one or more decoding outcomes in a first stage of the UCI message and that includes the CSI report in a second stage of the UCI message.

Aspect 9: The method of any of Aspects 1-4, wherein the set of candidate resources comprises one or more of: a first resource associated with all acknowledgement decoding outcomes for the one or more downlink communications, a second resource associated with all negative acknowledgement decoding outcomes for the one or more downlink communications, a third resource associated with decoding outcomes having a first number of negative acknowledgement decoding outcomes for the one or more downlink communications, wherein the first number satisfies an outcome threshold, and a fourth resource associated with decoding outcomes having a second number of negative acknowledgement decoding outcomes for the one or more downlink communications, wherein the second number fails to satisfy the outcome threshold.

Aspect 10: The method of Aspect 9, wherein one or more of the third resource or the fourth resource are configured with a field for indicating the one or more decoding outcomes associated with the one or more downlink communications, and wherein transmitting the CSI report via the resource comprises transmitting the CSI report and indications of the one or more decoding outcomes via the third resource or the fourth resource.

Aspect 11: The method of Aspect 9, wherein the outcome threshold is based at least in part on one or more of: an indication from a base station, or a probability of the one or more downlink communications having decoding outcomes having a number of negative acknowledgments that satisfies the outcome threshold.

Aspect 12: The method of any of Aspects 1-11, wherein the CSI report includes a first set of information associated with the one or more decoding outcomes including zero negative acknowledgments, or wherein the CSI report includes a second set of information associated with the one or more decoding outcomes including at least one negative acknowledgment.

Aspect 13: A method of wireless communication performed by a base station, comprising: receiving a channel state information (CSI) report via a resource of a set of candidate resources configured for receiving the CSI report; and determining, based at least in part on receiving the CSI report via the resource, one or more decoding outcomes associated with one or more downlink communications.

Aspect 14: The method of Aspect 13, wherein receiving the CSI report via the resource indicates the one or more decoding outcomes associated with the one or more downlink communications.

Aspect 15: The method of any of Aspects 13-14, wherein a payload size of the CSI report is based at least in part on the one or more decoding outcomes.

Aspect 16: The method of any of Aspects 13-15, wherein determining the one or more decoding outcomes comprises one or more of: determining, based at least in part on receiving the CSI report via the resource, a number of negative acknowledgment decoding outcomes associated with the one or more downlink communications, or determining, based at least in part on receiving the CSI report via the resource, a number of acknowledgment decoding outcomes associated with the one or more downlink communications.

Aspect 17: The method of any of Aspects 13-16, further comprising: transmitting an indication of the set of candidate resources for selection, by a receiver device, based at least in part on the one or more decoding outcomes associated with the one or more downlink communications.

Aspect 18: The method of any of Aspects 13-17, wherein the set of candidate resources comprises one or more of: a first resource associated with all acknowledgement decoding outcomes for the one or more downlink communications, a second resource associated with all negative acknowledgement decoding outcomes for the one or more downlink communications, or a third resource associated with one or more acknowledgement decoding outcomes and one or more negative acknowledgement decoding outcomes for the one or more downlink communications.

Aspect 19: The method of Aspect 18, wherein the third resource is configured with a field for indicating the one or more decoding outcomes associated with the one or more downlink communications, and wherein receiving the CSI report via the resource comprises receiving the CSI report and indications of the one or more decoding outcomes via the third resource.

Aspect 20: The method of Aspect 19, wherein the third resource comprises a two stage uplink control information (UCI) message that includes the indications of the one or more decoding outcomes in a first stage of the UCI message and that includes the CSI report in a second stage of the UCI message.

Aspect 21: The method of any of Aspects 13-17, wherein the set of candidate resources comprises one or more of: a first resource associated with all acknowledgement decoding outcomes for the one or more downlink communications, a second resource associated with all negative acknowledgement decoding outcomes for the one or more downlink communications, a third resource associated with decoding outcomes having a first number of negative acknowledgement decoding outcomes for the one or more downlink communications, wherein the first number satisfies an outcome threshold, and a fourth resource associated with decoding outcomes having a second number of negative acknowledgement decoding outcomes for the one or more downlink communications, wherein the second number fails to satisfy the outcome threshold.

Aspect 22: The method of Aspect 21, wherein one or more of the third resource or the fourth resource are configured with a field for indicating the one or more decoding outcomes associated with the one or more downlink communications, and wherein receiving the CSI report via the resource comprises transmitting the CSI report and indications of the one or more decoding outcomes via the third resource or the fourth resource.

Aspect 23: The method of Aspect 21, wherein the outcome threshold is based at least in part on one or more of: an indication transmitted to a receiver device, or a probability of the one or more downlink communications having decoding outcomes having a number of negative acknowledgments that satisfies the outcome threshold.

Aspect 24: The method of any of Aspects 13-23, wherein the CSI report includes a first set of information associated with the one or more decoding outcomes including zero negative acknowledgments, or wherein the CSI report includes a second set of information associated with the one or more decoding outcomes including at least one negative acknowledgment.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the memory and the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        determine, based at least in part on one or more decoding outcomes associated with one or more downlink communications, a resource, to use for transmitting a channel state information (CSI) report, wherein the resource is determined based at least in part on the one or more decoding outcomes being associated with an acknowledgement decoding outcome or a negative acknowledgement decoding outcome, and wherein the resource is a resource of a channel determined from a set of candidate resources having different times, frequencies, or sizes; and
        transmit the CSI report via the resource.

2. The UE of claim 1, wherein transmission of the CSI report via the resource indicates the one or more decoding outcomes associated with the one or more downlink communications.

3. The UE of claim 1, wherein a payload size of the CSI report is based at least in part on the one or more decoding outcomes.

4. The UE of claim 1, wherein the one or more processors, to determine the resource of the set of candidate resources, are configured to:
    determine the resource based at least in part on a number of negative acknowledgement decoding outcomes associated with the one or more downlink communications, or
    determine the resource based at least in part on a number of acknowledgement decoding outcomes associated with the one or more downlink communications.

5. The UE of claim 1, wherein the one or more processors are further configured to:
    receive an indication of the set of candidate resources for selection based at least in part on the one or more decoding outcomes associated with the one or more downlink communications.

6. The UE of claim 1, wherein the set of candidate resources comprises one or more of:

a first resource associated with all acknowledgement decoding outcomes for the one or more downlink communications,
a second resource associated with all negative acknowledgement decoding outcomes for the one or more downlink communications, or
a third resource associated with one or more acknowledgement decoding outcomes and one or more negative acknowledgement decoding outcomes for the one or more downlink communications.

7. The UE of claim 6, wherein the third resource is configured with a field for indicating the one or more decoding outcomes associated with the one or more downlink communications, and
    wherein the one or more processors, to transmit the CSI report via the resource, are configured to transmit the CSI report and indications of the one or more decoding outcomes via the third resource.

8. The UE of claim 7, wherein the third resource comprises a two stage uplink control information (UCI) message that includes the indications of the one or more decoding outcomes in a first stage of the UCI message and that includes the CSI report in a second stage of the UCI message.

9. The UE of claim 1, wherein the set of candidate resources comprises one or more of:
    a first resource associated with all acknowledgement decoding outcomes for the one or more downlink communications,
    a second resource associated with all negative acknowledgement decoding outcomes for the one or more downlink communications,
    a third resource associated with decoding outcomes having a first number of negative acknowledgement decoding outcomes for the one or more downlink communications, wherein the first number satisfies an outcome threshold, and
    a fourth resource associated with decoding outcomes having a second number of negative acknowledgement decoding outcomes for the one or more downlink communications, wherein the second number fails to satisfy the outcome threshold.

10. The UE of claim 9, wherein one or more of the third resource or the fourth resource are configured with a field for indicating the one or more decoding outcomes associated with the one or more downlink communications, and
    wherein the one or more processors, to transmit the CSI report via the resource, are configured to transmit the CSI report and indications of the one or more decoding outcomes via the third resource or the fourth resource.

11. The UE of claim 9, wherein the outcome threshold is based at least in part on one or more of:
    an indication from a network entity, or
    a probability of the one or more downlink communications having decoding outcomes having a number of negative acknowledgements that satisfies the outcome threshold.

12. The UE of claim 1, wherein the CSI report includes a first set of information associated with the one or more decoding outcomes including zero negative acknowledgements, or
    wherein the CSI report includes a second set of information associated with the one or more decoding outcomes including at least one negative acknowledgement.

13. A network entity for wireless communication, comprising:

a memory; and
one or more processors, coupled to the memory, configured to:
receive, from a user equipment (UE) a channel state information (CSI) report via a resource configured for receiving the CSI report, wherein the resource is a resource of a channel determined from a set of candidate resources having different times, frequencies, or sizes; and
determine, based at least in part on receiving the CSI report via the resource, wherein the resource is associated with an acknowledgement decoding outcome or a negative acknowledgement decoding outcome, one or more decoding outcomes associated with one or more downlink communications.

14. The network entity of claim 13, wherein reception of the CSI report via the resource indicates the one or more decoding outcomes associated with the one or more downlink communications.

15. The network entity of claim 13, wherein the one or more processors are further configured to:
transmit an indication of the set of candidate resources for selection based at least in part on the one or more decoding outcomes associated with the one or more downlink communications.

16. A method of wireless communication performed by a user equipment (UE), comprising:
determining, based at least in part on one or more decoding outcomes associated with one or more downlink communications, a resource, to use for transmitting a channel state information (CSI) report, wherein the resource is determined based at least in part on the one or more decoding outcomes being associated with an acknowledgement decoding outcome or a negative acknowledgement decoding outcome, and wherein the resource is a resource of a channel determined from a set of candidate resources having different times, frequencies, or sizes; and
transmitting the CSI report via the resource.

17. The method of claim 16, wherein transmitting the CSI report via the resource indicates the one or more decoding outcomes associated with the one or more downlink communications.

18. The method of claim 16, wherein a payload size of the CSI report is based at least in part on the one or more decoding outcomes.

19. The method of claim 16, wherein determining the resource of the set of candidate resources comprises one or more of:
determining the resource based at least in part on a number of negative acknowledgement decoding outcomes associated with the one or more downlink communications, or
determining the resource based at least in part on a number of acknowledgement decoding outcomes associated with the one or more downlink communications.

20. The method of claim 16, further comprising:
receiving an indication of the set of candidate resources for selection based at least in part on the one or more decoding outcomes associated with the one or more downlink communications.

21. The method of claim 16, wherein the set of candidate resources comprises one or more of:
a first resource associated with all acknowledgement decoding outcomes for the one or more downlink communications,
a second resource associated with all negative acknowledgement decoding outcomes for the one or more downlink communications, or
a third resource associated with one or more acknowledgement decoding outcomes and one or more negative acknowledgement decoding outcomes for the one or more downlink communications.

22. The method of claim 21, wherein the third resource is configured with a field for indicating the one or more decoding outcomes associated with the one or more downlink communications, and
wherein transmitting the CSI report via the resource comprises transmitting the CSI report and indications of the one or more decoding outcomes via the third resource.

23. The method of claim 22, wherein the third resource comprises a two stage uplink control information (UCI) message that includes the indications of the one or more decoding outcomes in a first stage of the UCI message and that includes the CSI report in a second stage of the UCI message.

24. The method of claim 16, wherein the set of candidate resources comprises one or more of:
a first resource associated with all acknowledgement decoding outcomes for the one or more downlink communications,
a second resource associated with all negative acknowledgement decoding outcomes for the one or more downlink communications,
a third resource associated with decoding outcomes having a first number of negative acknowledgement decoding outcomes for the one or more downlink communications, wherein the first number satisfies an outcome threshold, and
a fourth resource associated with decoding outcomes having a second number of negative acknowledgement decoding outcomes for the one or more downlink communications, wherein the second number fails to satisfy the outcome threshold.

25. The method of claim 24, wherein one or more of the third resource or the fourth resource are configured with a field for indicating the one or more decoding outcomes associated with the one or more downlink communications, and
wherein transmitting the CSI report via the resource comprises transmitting the CSI report and indications of the one or more decoding outcomes via the third resource or the fourth resource.

26. The method of claim 24, wherein the outcome threshold is based at least in part on one or more of:
an indication from a network entity, or
a probability of the one or more downlink communications having decoding outcomes having a number of negative acknowledgements that satisfies the outcome threshold.

27. The method of claim 16, wherein the CSI report includes a first set of information associated with the one or more decoding outcomes including zero negative acknowledgements, or
wherein the CSI report includes a second set of information associated with the one or more decoding outcomes including at least one negative acknowledgement.

28. A method of wireless communication performed by a network entity, comprising:
receiving, from a user equipment (UE), a channel state information (CSI) report via a resource configured for receiving the CSI report, wherein the resource is a resource of a channel determined from a set of candidate resources having different times, frequencies, or sizes; and determining, based at least in part on receiving the CSI report via the resource, wherein the resource is associated with an acknowledgement decoding outcome or a negative acknowledgement decoding outcome, one or more decoding outcomes associated with one or more downlink communications.

29. The method of claim 28, wherein receiving the CSI report via the resource indicates the one or more decoding outcomes associated with the one or more downlink communications.

30. The method of claim 28, further comprising:

transmitting an indication of the set of candidate resources for selection, by a receiver device, based at least in part on the one or more decoding outcomes associated with the one or more downlink communications.

31. The UE of claim 1, wherein the resource is a physical uplink control channel (PUCCH) resource.

* * * * *